Aug. 8, 1961   N. C. BEESE ET AL   2,995,064
MOTION PICTURE PROJECTOR
Filed Jan. 2, 1958

INVENTORS
NORMAN C. BEESE and
THEODORE C. RETZER.
BY
W. D. Palmer
ATTORNEY.

United States Patent Office 2,995,064
Patented Aug. 8, 1961

2,995,064
MOTION PICTURE PROJECTOR
Norman C. Beese, Verona, and Theodore C. Retzer, Cedar Grove, N.J., assignors to Westinghouse Electric Corporation, East Pittsburgh, Pa., a corporation of Pennsylvania
Filed Jan. 2, 1958, Ser. No. 706,849
4 Claims. (Cl. 88—18)

This invention relates to motion-picture projectors and, more particularly, to a shutterless motion-picture projector which utilizes an A.C.-operated, super-high-pressure short-arc lamp as a projector light source and an intermittent movement for advancing the film.

Heretofore the usual motion-picture projector has been provided with a shutter which serves to mask the light while the next-succeeding frame of film is advanced into operating position intermediate the projector light source and the projector lens. The use of shutters somewhat complicates the projector design. The projector light sources normally comprise incandescent lamps or arc lamps and super-high-pressure, short-arc lamps have been used in some limited cases. Shutterless projectors have been devised previously, such as for high-speed photographic purposes, wherein an electronic-flash type of light source is used. These shutterless projectors have incorporated a continuously-moving film and such a projector is described in Patent No. 2,186,013 to Edgerton wherein the period of exposure of each frame of the film is in the order of microseconds. Such a projector as disclosed by Edgerton is not suitable for the usual motion-picture systems which require the frames of the film to be illuminated for substantially more than fifty percent of the total time.

In order to overcome the foregoing and other difficulties of and objections to the prior art, it is the general object of this invention to provide a shutterless motion-picture projector.

The aforesaid object of the invention, and other objects which will become apparent as the description proceeds, are achieved by providing a shutterless motion-picture projector which utilizes an alternating-current-operable, super-high-pressure short-arc lamp as a light source. A grid-controlled current-shunting means is provided to shunt for predetermined periods at least a substantial portion of the operating current of said light source in order to suppress the light emanated from the light source. There is also provided a film-advancing means for advancing the motion picture film with an intermittent motion in a frame-by-frame sequence. The operation of the current-shunting means is synchronized with the operation of the film-advancing means so that when the film is advancing, the light output of the projector light source is suppressed.

For a better understanding of the invention, reference should be had to the accompanying drawing wherein.

Figure 1:
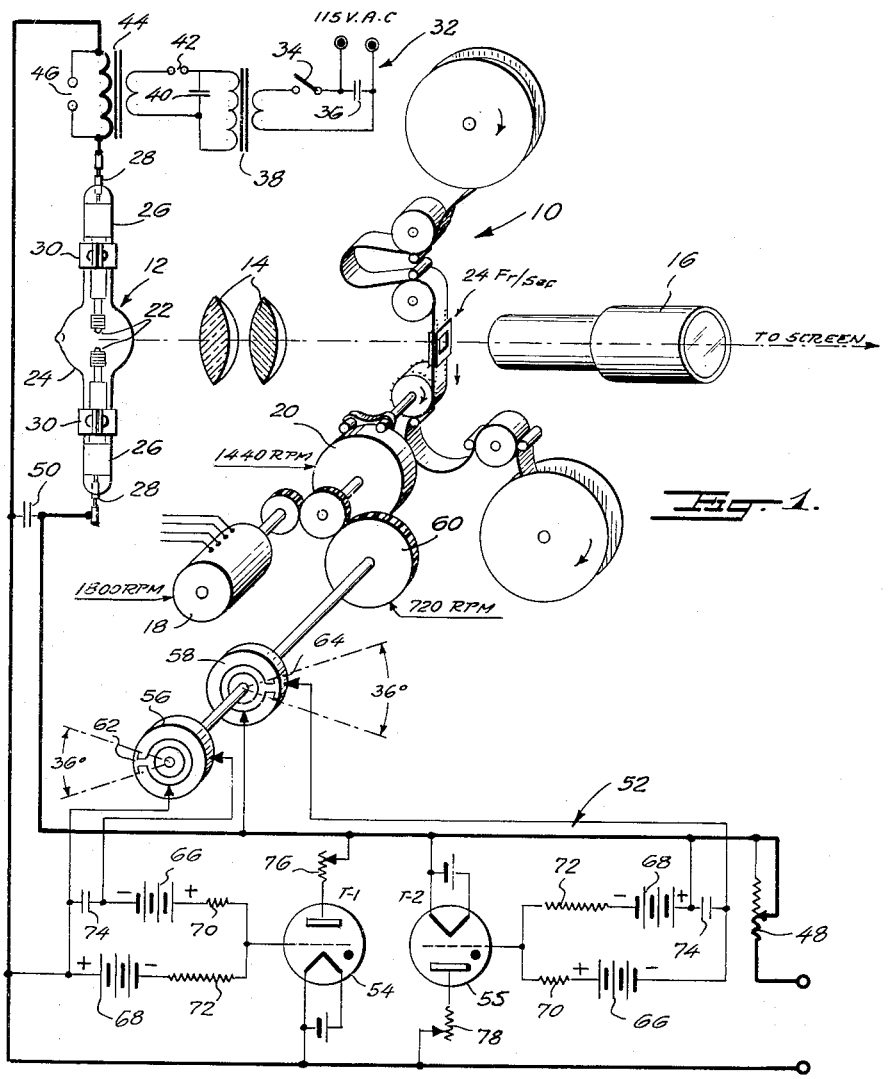
FIG. 1 is a schematic view of a motion-picture projector constructed in accordance with the instant invention.

With specific reference to the form of the invention illustrated in the drawing, in FIG. 1 is shown a shutterless motion-picture projector 10 which is adapted to operate at a speed of twenty-four frames per second, as is usual. Light from the projector light source 12 is focused through a condensing lens system 14 onto the film frame which is in operating position, through the projector lens 16 and onto the screen (not shown). The condensing lens system 14, the projector lens 16 and the film-advancing mechanism as well as the associated wind and unwind reels may be conventional. The film is advanced with what is known in the art as an intermittent movement. In such movement, a synchronous motor 18, such as an 1800 r.p.m. motor for example, is geared down to 1440 r.p.m. and this in turn operates an intermittent movement gear 20. For further details of the intermittent movement gear, reference is made to pages 970–975, "Motion Picture Projection" by James R. Cameron, Fourth edition (1928), published by Cameron Publishing Company, Inc., Manhattan Beach, New York.

The projector light source 12 comprises a super-high-pressure, short-arc lamp and such a lamp is generally described in Patent No. 2,682,009, dated June 22, 1954 to H. D. Fraser. Briefly, such lamps comprise a pair of operating electrodes 22 sealed in a generally-spherical quartz envelope 24 having oppositely-disposed, elongated arms 26 extending therefrom with lead conductors 28 sealed therethrough. Lamp supports 30 may be provided on the elongated arms 26. The lamp envelope is filled with a small quantity of inert, ionizable gas, such as argon, and a charge of mercury, such as 0.5 gm., for example, in the case of an 800 watt lamp. Alternative envelope fillings are mercury and xenon at an appreciable pressure such as two atmospheres or xenon as such, at a pressure of nine atmospheres, for example. The type of gas filling is selected according to the lamp-operating characteristics desired and the pressure of the gas fillings and the mercury charge, if used, may be varied considerably, as is well known.

Such lamps operate at a very high pressure such as twelve or more atmospheres, for example, and the resulting arc is very short as determined by the electrode spacing. Accordingly these lamps are known by the term super-high-pressure, short-arc lamps. This type of lamp is relatively difficult to start initially and a starting circuit 32 is normally required, which starting circuit is generally as disclosed in Patent No. 2,708,251, dated May 10, 1955 to C. M. Rively. Briefly, the starting circuit 32 comprises a manually-operated switch 34 which is closed to initiate the lamp operation and the power supply terminals desirably have a condenser 36 provided thereacross in order that the high-frequency oscillations which are generated by the starting circuit are not fed back into the power supply. A first step-up transformer 38 is used to increase the line voltage to about 7500 volts, for example, and a condenser 40 is charged upon closing the switch 34. Before the condenser 40 is fully charged, a breakdown occurs across the spark gap terminals 42, which causes very rapid oscillations to be set up in the circuit. These high frequency oscillations are transmitted through a second step-up transformer 44 and are superimposed upon the 115 volt, 60 cycle A.C. which is utilized to operate the lamp. Additional spark gap terminals 46 are provided across the secondary of the second step-up transformer 44 as a safety measure. Thus a high frequency, high voltage such as 50,000 volts is superimposed across the lamp electrodes 22 and this ionizes the discharge path between the lamp electrodes. Thereafter, the manual switch 34 is opened and the lamp operates through a dropping resistor 48 from the 115 volt A.C. line. The dropping resistor 48 has a total resistance of twenty ohms, for example, and is variable to accommodate individual lamp types. A shunting condenser 50 is also provided in order to prevent the high-potential, high-frequency starting voltage from damaging the lamp-quenching circuit 52, as will be described in detail hereinafter.

The lamp-quenching circuit 52 comprises a pair of thyratrons 54 and 55, which thyratrons have their anodes and cathodes connected in an opposing fashion across the line, with separate heater circuits supplied for the cathodes. The grid of each thyratron is connected to grid-biasing circuits, which are in turn actuated by a pair of commutators 56 and 58. Both commutators are keyed to a shaft connected to a gear 60 which in turn is geared to the synchronous motor 18. Each of the commutators 56 and 58 include individual conducting segments 62 and 64 on their peripheral surfaces and for the specific embodiment disclosed wherein these commutators rotate at 720 r.p.m., the conducting segments occupy a peripheral arc of 36° or less. These conducting segments 62 and 64 are electrically connected to the corresponding thyratron cathodes. In the embodiment as shown, the commutator 58 has rotated so that the grid-biasing circuit for thyraton 55 is energized through an electrical contact which rides on the commutator 58. Each grid-biasing circuit comprises a pair of similar batteries 66 and 68 and the thyratron grids are connected to these batteries through resistances 70 and 72 which have different magnitudes. When the commutator 58 has revolved to the position as shown in FIG. 1, for example, current will flow through both of the batteries 66 and 68 and since the resistance 70 is of smaller value than the resistance 72, this will cause the grid of the thyratron 55 to be positively biased. This in turn will cause the thyratron 55 to fire and the voltage drop across the lamp electrodes will be such that the lamp 12 will be partially or fully extinguished. The thyratrons 54 and 55 thus constitute a current-shunting means to suppress the operation and consequently the light output of the projector lamp 12.

When the commutator 58 has revolved so that the conducting segment 64 is no longer in direct electrical connection with the battery 66, the grid of thyratron 55 will have a negative bias since the positive side of the battery 68 will be at the same potential as the cathode of the thyratron 55. Additional capacitors 74 may be provided across each of the grid-biasing circuits in order to quench any possible arcing when direct electrical contacts between the conducting commutator segments and the electrical contacts riding thereon are broken.

The grid-biasing circuit for the thyratron 54 is generally identical with the grid-biasing circuit for the thyratron 55, but is actuated 180° out of phase due to the positioning of the conducting segment 62 on the commutator 56.

It may be desirable in some cases to allow the light source 12 to remain at least partially operative in order that the arc discharge may be re-established more readily. Normally this is not required since the residual ionization in the lamp envelope 24 is sufficient to cause the lamp to start without any separate manual starting circuit, at least after the arc has been extinguished for only a very short period such as 1/120 of a second. If it is desired to diminish the intensity of the arc while still maintaining same during the period the film is being advanced, this can be accomplished by adjusting the resistors 76 and 78 in the plate circuits of the thyratrons 54 and 55. Desirably, however, a substantial portion of the lamp operating current is shunted to render the lamp at least substantially non-operative with respect to its normal light output.

Figure 2:
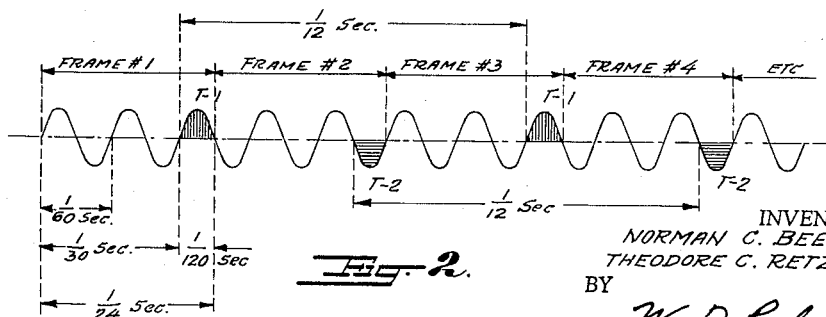
FIG. 2 is a diagrammatic view representing the operating characteristics for the projector as shown in FIG. 1.

The operation of the unit is diagrammatically illustrated in FIGURE 2. The first frame of the film will be in operating position for 1/30 of a second which is equivalent to four half waves of the sixty-cycle A.C. operating potential. At the start of the fifth half wave, the conducting segment 62 on the commutator 56 will cause the grid-biasing circuit of thyratron 54 to bias the thyratron grid positively and the thyratron will conduct to shunt out at least a substantial portion of the operating current of the lamp. At the end of this half cycle, the conducting segment 62 on the commutator 56 will have revolved sufficiently that the grid of the thyratron 54 will again be negatively biased. During the period while the current is shunted from the lamp, the intermittent movement gear 20 will cause the next frame of the film to be advanced into operating position. Frame No. 2 of the film will remain in operating position for 1/30 of a second, after which period the conducting segment 64 of the commutator 58 will be in direct electrical contact with battery 66 to bias positively the grid of thyratron 55. This will cause the thyratron 55 to conduct for this next-succeeding fifth half cycle and shunt the current from the light source 12. During this period, the light source is suppressed in output and the next-succeeding frame of film is advanced by the intermittent movement gear 20. Each succeeding frame of film is thereafter advanced during the period that the light output of the light source is suppressed.

It will be recognized that the object of the invention has been achieved by providing a shutterless motion-picture projector.

In the foregoing embodiment, the current-shunting means comprising the thyratrons and associated circuitry have been controlled through a grid-biasing arrangement. This is highly desirable since the electrical contacts to the conducting segments on the commutators would tend to corrode rapidly if any appreciable current was shunted. From a theoretical standpoint, with unity power factor, the thyratrons could be dispensed with and the commutators per se utilized as a current-shunting means. As a practical matter, however, it is highly desirable to use the grid-controlled current-shunting means to shunt at least a substantial portion of the operating current for the light source.

While in the preferred embodiment the film is operated at a rate of 24 frames per second, it should be realized that the instant design could be utilized for other film speeds such as 20 frames per second, for example. With other film speeds and 60 cycle A.C. operation, for example, the gearing and circuitry could readily be altered in order to suppress the light source on other than every fifth half cycle of the operating potential. As an example, the thyratrons and commutators could readily be designed to shunt the lamp current every fourth or sixth half cycle. In such a design, only one commutator and thyratron would be required, since when suppressing the light on even half cycles, the design is operable with just one thyratron current-shunting means. Thus the preferred embodiment as disclosed may readily be adapted to suppress the operation of the light source for any preselected periodic half cycles of the A.C. operating potential.

In the preferred embodiment illustrated in FIG. 1, the conducting segments 62 and 64 on the commutators 56 and 58 occupy an arc of thirty-six degrees. These segments may occupy considerably less than the indicated arc for the embodiment as described, since once the thyratron is triggered, it will continue to fire until the anode becomes negative with respect to the cathode. If vacuum tubes were to be substituted for the thyratrons, however, the conducting segments desirably would occupy the indicated arc of thirty-six degrees.

While one best embodiment of the invention has been illustrated and described in detail, it is to be particularly understood that the invention is not limited thereto or thereby.

We claim:

1. A shutterless motion-picture projector comprising, a projection lens, a projector light source comprising an alternating-current-operable super-high-pressure short-arc lamp, film-advancing means for advancing motion-picture film with an intermittent motion in frame-by-frame sequence between said projector light source and said lens, grid-controlled thyratron current-shunting means operable to shunt at least a substantial portion of the operating current for said light source to suppress the light output of said light source, and synchronizing means for synchronizing the grid bias of said thyratron current-shunting means with the operation of said film-advancing means so that when said film is advancing the light output of said light source is suppressed.

2. A shutterless motion-picture projector comprising, a projection lens, a projector light source comprising an alternating-current-operable super-high-pressure short-arc lamp, synchronous-motor-driven, film-advancing means for advancing motion-picture film with an intermittent motion in frame-by-frame sequence between said projector light source and said lens, grid-controlled thyratron current-shunting means operable to shunt at least a substantial portion of the operating current for said light source to suppress the light output of light source, and thyratron grid-biasing means actuated by the synchronous motor drive for said film-advancing means for applying a positive grid bias to said thyratron current-shunting means when said film is being advanced by said film-advancing means.

3. A shutterless motion-picture projector comprising, a projector lens, a projector light source comprising an alternating-current-operable super-high-pressure short-arc lamp, film-advancing means for advancing motion-picture film with an intermittent motion in frame-by-frame sequence between said projector light source and said lens, grid-controlled thyratron current-shunting means operable to shunt at least a substantial portion of the operating alternating current for said light source only during every periodic fourth to every periodic sixth half cycle of such operating alternating current to suppress periodically the light output of said light source, and synchronizing means for synchronizing the grid bias of said thyratron current-shunting means with the operation of said film-advancing means so that when said film is advancing the light output of said light source is suppressed.

4. A shutterless motion-picture projector comprising, a projector lens, a projector light source comprising an alternating-current-operable super-high-pressure short-arc lamp, film advancing means for advancing motion-picture film with an intermittent motion in frame-by-frame sequence between said projector light source and said lens, grid-controlled thyratron current-shunting means operable to shunt at least a substantial portion of the operating alternating current for said light source only during every periodic fifth half cycle of such operating alternating current to suppress periodically the light output of said light source, and synchronizing means for synchronizing the grid bias of said thyratron current-shunting means with the operation of said film-advancing means so that when said film is advancing the light output of said light source is suppressed.

References Cited in the file of this patent

UNITED STATES PATENTS

| | | |
|---|---|---|
| 1,206,984 | Bloom | Dec. 5, 1916 |
| 2,186,013 | Edgerton | Jan. 9, 1940 |
| 2,727,169 | Noel | Dec. 13, 1955 |

FOREIGN PATENTS

| | | |
|---|---|---|
| 25,539 | Australia | July 13, 1936 |
| 484,565 | Great Britain | May 9, 1938 |
| 489,787 | Great Gritain | Aug. 4, 1938 |
| 595,139 | Great Britain | Nov. 27, 1947 |
| 877,862 | Germany | May 28, 1953 |